United States Patent
Cromer et al.

(10) Patent No.: US 6,266,696 B1
(45) Date of Patent: *Jul. 24, 2001

(54) FULL TIME NETWORK AUXILIARY FOR A NETWORK CONNECTED PC

(75) Inventors: Daryl Carvis Cromer; Howard Locker, both of Cary; James Peter Ward, Raleigh; David Benson Rhoades, Apex, all of NC (US)

(73) Assignee: International Business Machine Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,231

(22) Filed: Feb. 17, 1998

(51) Int. Cl.[7] .................................................. G06F 15/173

(52) U.S. Cl. ........................... 709/224; 709/223; 709/250

(58) Field of Search .................................... 709/250, 223, 709/224

(56) References Cited

U.S. PATENT DOCUMENTS

| | | | | |
|---|---|---|---|---|
| 5,367,670 | * | 11/1994 | Ward et al. | 395/575 |
| 5,404,544 | * | 4/1995 | Crayford | 395/750 |
| 5,487,148 | * | 1/1996 | Komori et al. | 714/4 |
| 5,504,905 | * | 4/1996 | Cleary et al. | 713/100 |
| 5,761,085 | * | 6/1998 | Giorgio | 702/33 |
| 5,781,703 | * | 7/1998 | Desai et al. | 706/50 |
| 5,809,313 | * | 9/1998 | Gianni | 713/310 |
| 5,815,652 | * | 9/1998 | Ote et al. | 714/31 |
| 5,945,915 | * | 8/1999 | Cromer et al. | 340/686.1 |

* cited by examiner

Primary Examiner—Saleh Najjar
(74) Attorney, Agent, or Firm—George E. Grosser

(57) ABSTRACT

A client on a network is provided with auxiliary low power logic, at the network adaptor, that is always active and simulates network traffic (e.g. Ethernet format) normally sent under control of the main client system processor(s). This logic collects client status information and reports to the network manager, even when the system CPU is powered down; information which allows the network manager to exercise broader control and perform maintenance and upgrades which would otherwise require a dialog with the user and limit off-hours maintenance and reconfiguration of the client system. The auxiliary logic also can receive and interpret commands from the network that conform to a predefined format.

4 Claims, 10 Drawing Sheets

FULL TIME NETWORK AUXILIARY FOR A NETWORK CONNECTED PC

BACKGROUND OF THE INVENTION

1. Field of the Invention

The invention relates generally to the field of network-connected personal computers and, more specifically, to transfers of status and control information for such computers over a network.

2. Background

With personal computers (PCs) being increasingly connected into networks to allow transfers of data among computers to occur, more operations such a maintenance and updating of applications and data collections are occurring over the network.

As computers are also becoming essential to their users to perform their work it is desirable to shift the time when maintenance and updates occur to not interfere with productive work. Shifting the time for such activity is not an easy matter because the computers on the network (clients) are usually shut down at off hours and there is no one available at the client system to answer questions and take action at the direction of the network manager.

One solution to this problem has been wake-up technology, such as IBM's Wake on LAN technology which supports special signaling over a network to cause a client to power itself up. The network manager may then perform various operations on the client. This feature expands the ability of the network manager to do maintenance and upgrades but is limited to a single command to activate a system.

SUMMARY OF THE INVENTION

It is recognized, by the invention, that additional status and other information from the client would allow the network manager to provide increased off hours support but that is not desired to change from existing PC network structures and protocols and the major installed infrastructure of PC networks. According to the invention, low power logic is provided that is always active and stimulates normal network data traffic (e.g. Ethernet format) normally sent from and received by the client system.

Preferably, network updates are sent out by the special purpose logic to keep the network manager aware of selected status information. According to a preferred implementation, the signals are introduced to the client side of the "physical layer" of the network controller.

That is the layer that conditions the network-directed signal to analog form to go out over the physical connecting network. By so configuring the signal to have the characteristics of a standard network signal prepared by the client, it passes through the network as if any normal network signal sent by the client.

This surrogate client, with its low power requirements, stays active, preferably full time, and is able, on an ongoing basis, to keep the network manager aware of selected information regarding detected conditions at the client system. By so maintaining at the client, the ability to respond to information requests, the network manager is made aware of the actual conditions at the client and has greater latitude of flexibility in performing procedures on respective clients. It may even determine that a problem is beyond network resolution and send a maintenance or security request for on-site action. A problem might be addressed while the machine is unattended possibly before the user realizes a problem exists.

BRIEF DESCRIPTION OF THE DRAWINGS

A presently preferred implementation for the invention will now be described in detail with reference to the drawings wherein.

DESCRIPTION OF THE PREFERRED EMBODIMENT

Figure 1:
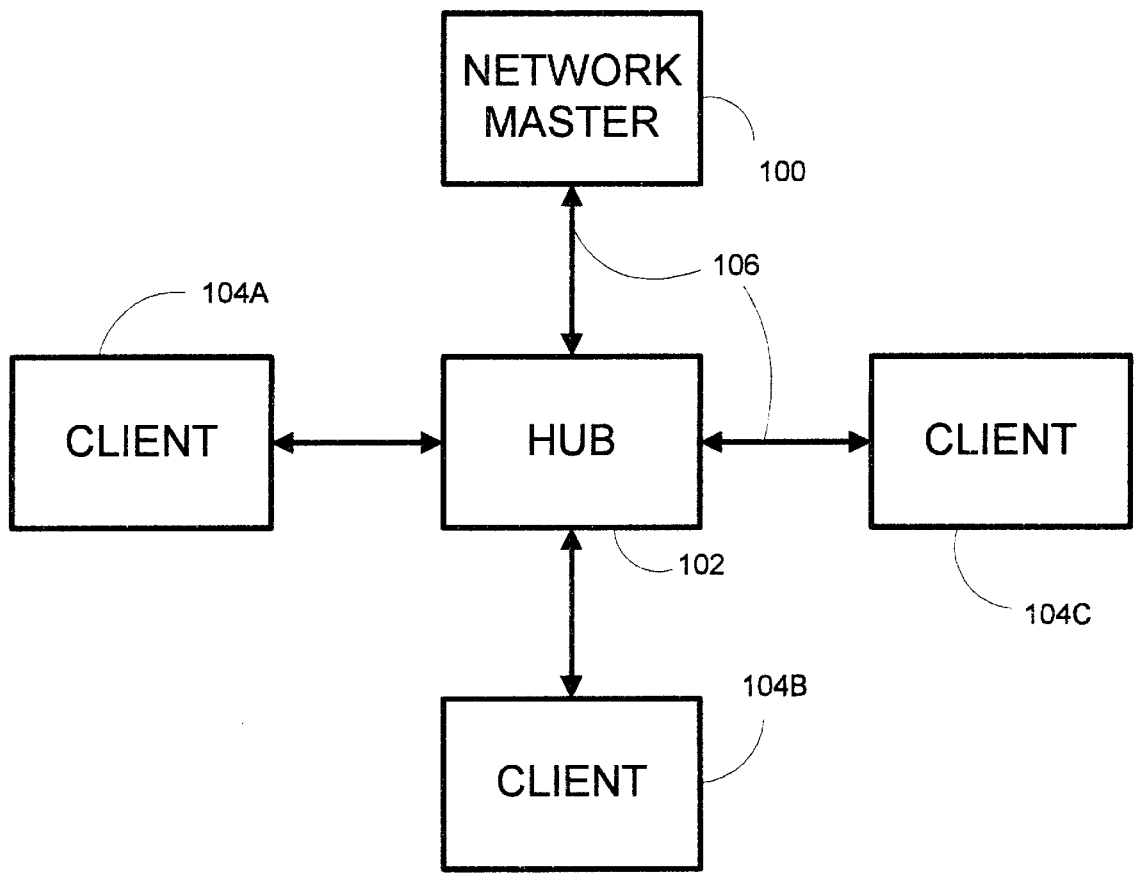
FIG. 1 is a block diagram of a network arrangement suitable for implementation of the invention.

Referring to FIG. 1, a network manager system 100 is connected to a hub 102 by a LAN connector bus 106. Respective client systems 104A–C also connect to the hub 102 through respective LAN busses 106. The preferred form of network conforms to the Ethernet specification and uses such hubs. It will be appreciated however that other forms of networks such as token ring may be implemented to include the invention.

Figure 2:
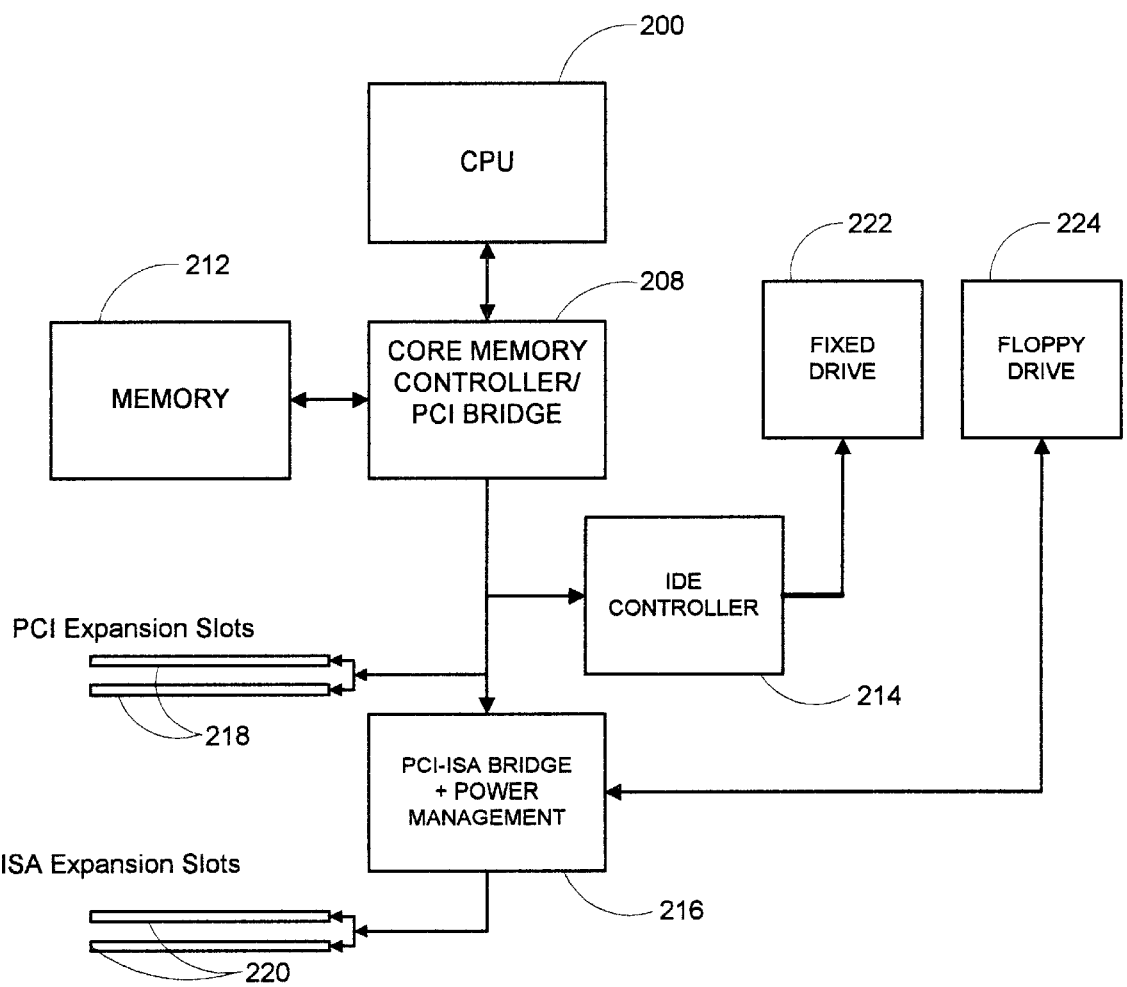
FIG. 2 is a block diagram of a client system suitable for implementation of the invention.

A computer system suitable for use as a client station 104 is indicated in FIG. 2. A central processing unit(CPU) 200 is connected by address, control and data busses 202 to a memory controller and PCI bus bridge chip 208. System memory 212 is connected to the chip 208 as are an IDE device controller 214 and a PCI bus to ISA bus bridge chip 216 which typically also includes power management logic. For an intelligent client station 104 there would normally be a fixed and a floppy drive 222 and 224 for data and program storage. A PCI standard expansion bus with connector slots 218 is coupled to the chip 208 and and ISA standard expansion bus with connector slots 220 is connected to bridge chip 216. It will be appreciated that other expansion bus types nay be used to permit expansion of the system with added devices and it is not necessary to have two expansion busses.

Figure 3:
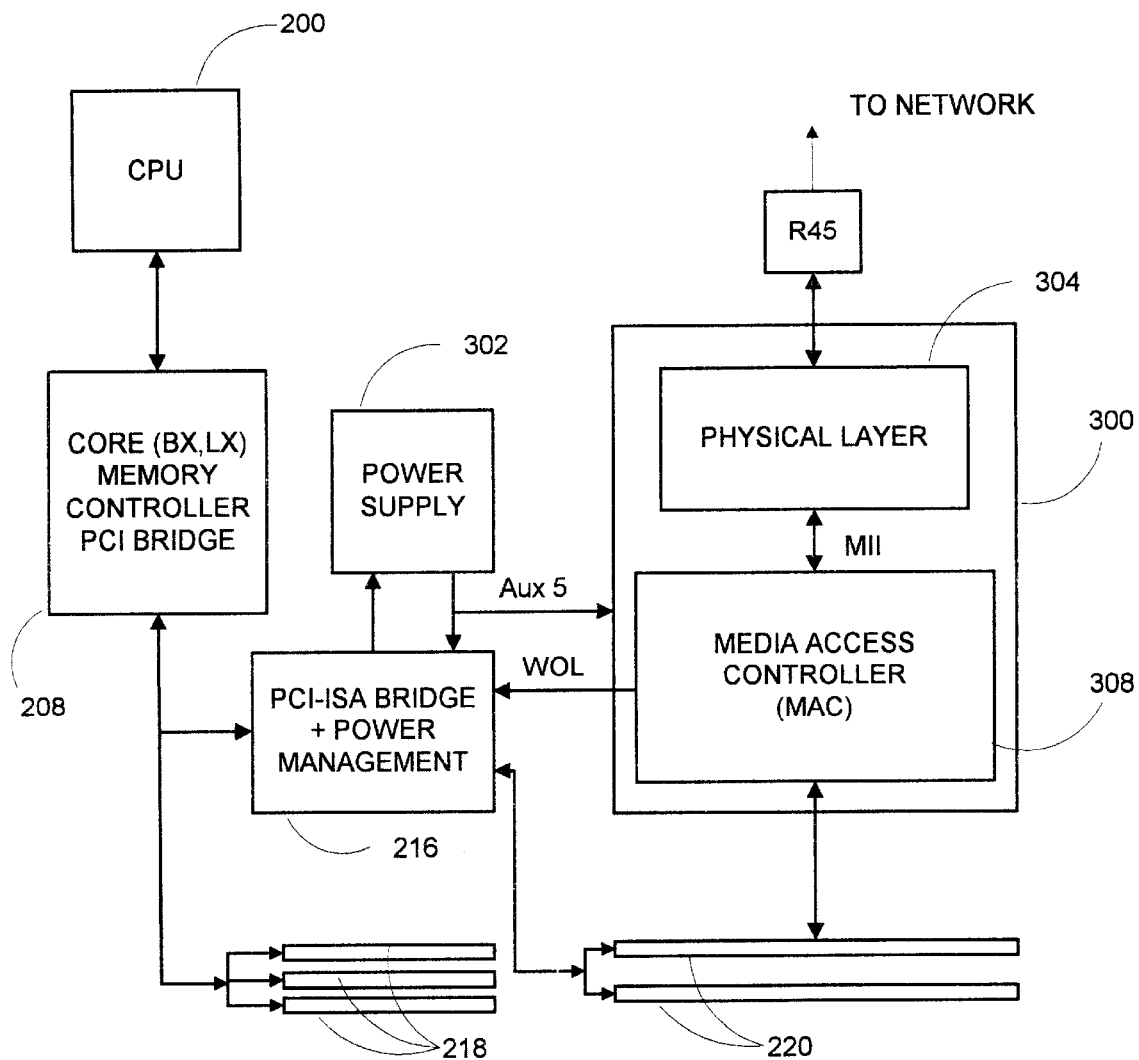
FIG. 3 is a block diagram of a system client with normal network connection circuitry.

Now, referring to FIG. 3, a client system 104, has a network adapter 300, which may, for example be plugged into one of connector slots 220. The client system 104 is shown with a special power supply 302 which responds to a signal WU to switch on and supply full normal system power and has a auxiliary power main Aux 5 which supplies full time power to the power management chip 216 and the network adapter 300. This enables the system, as is known, to respond to a wakeup signal and power up the system. The network adapter 300 is shown as two elements the physical layer 304 which conditions analog signals to go out to the network, for example an ethernet network over an R45 connector 306 as is well known. A media access controller (or MAC) 308 processes the network signals in digital form and comnnects to the bus 220. If the incoming signal conforms to Magic Packet form it is a wakeup command and the MAC 308 issues a WOL signal to cause the power supply to energize the client system 104. The adapter 300, it should be appreciated, may be added as an adapter card (as shown) or implemented directly on the system motherboard. To support wake up operation it is powered off the full time auxiliary line Aux 5.

Figure 4:
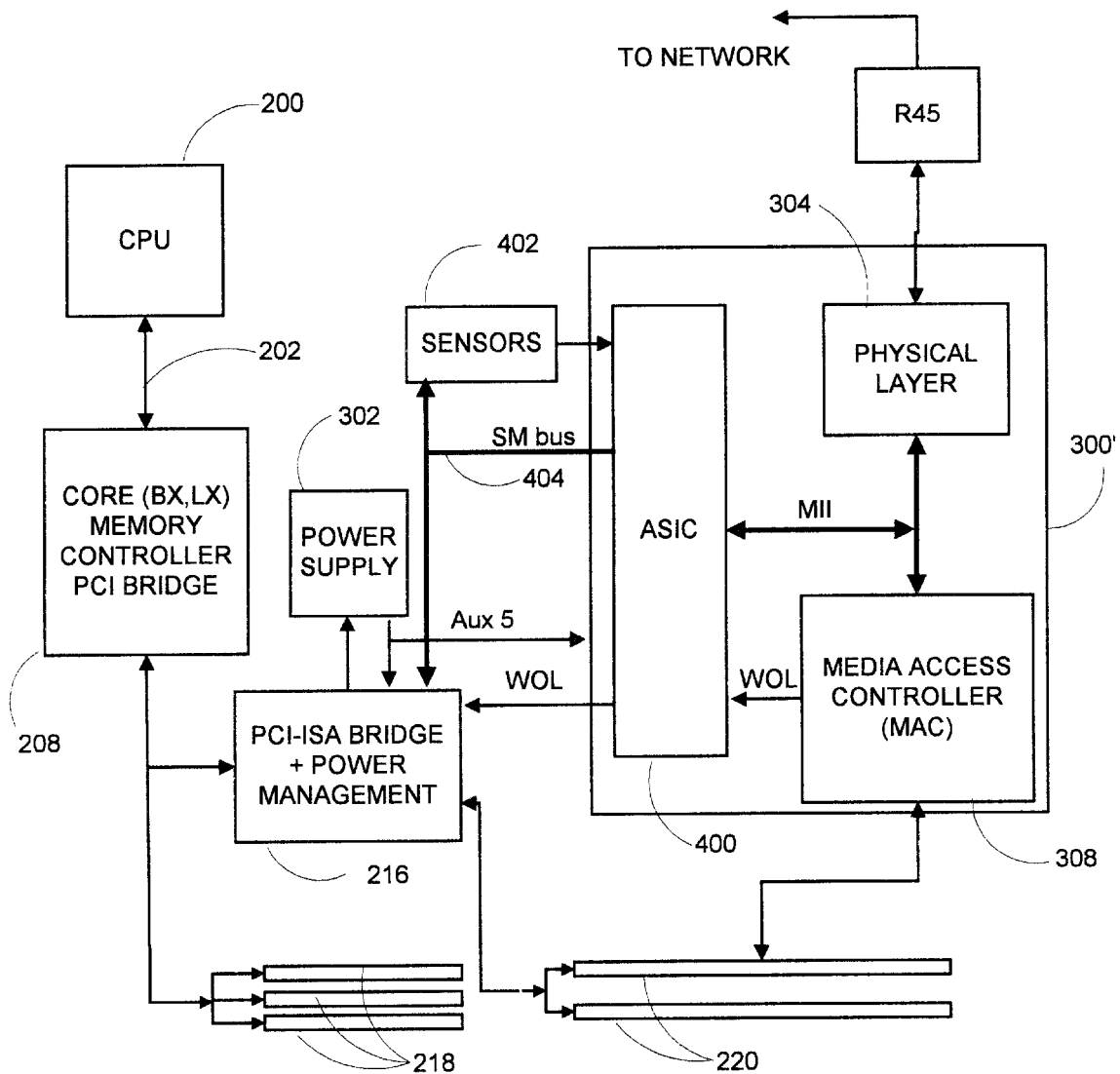
FIG. 4 is a block diagram of a system client with added logic coupled to the network connection circuitry to support transfer of status information over the network.

The client system 104 of FIG. 4 has a specially modified network adapter 300' with a logic module 400 connected at the MII bus that extends between the physical layer 304 and the MAC 308. This logic may be a "hard wired" ASIC or a programmed general purpose processor programmed as described below. By so connecting the logic 400 at the MII bus, it can send and receive network packets using the physical layer 304. The logic 400 according to the invention accepts data from a source such as sensors 402. Data fron the client system 104 is accessed by the logic 400 over the system management bus (SM bus) 404. With the trickle power supplied on bus Aux 5 of power supply 302 the logic 400 is preferably powered full time.

Figure 5:
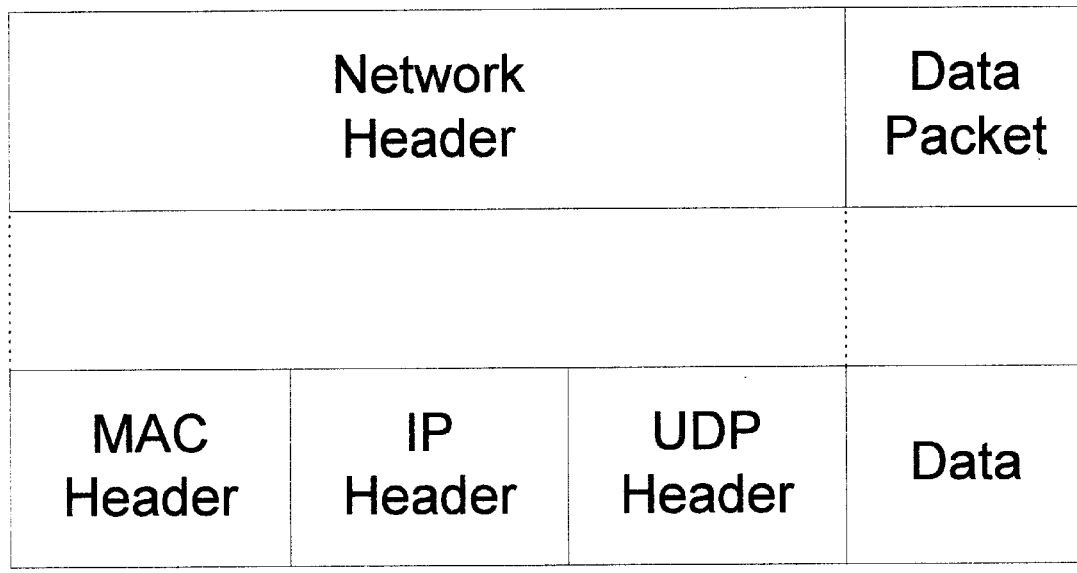
FIG. 5 is a diagrammatic representation of a packet of a kind that might be prepared for a LAN system based on an Ethernet specification.
Figure 6:
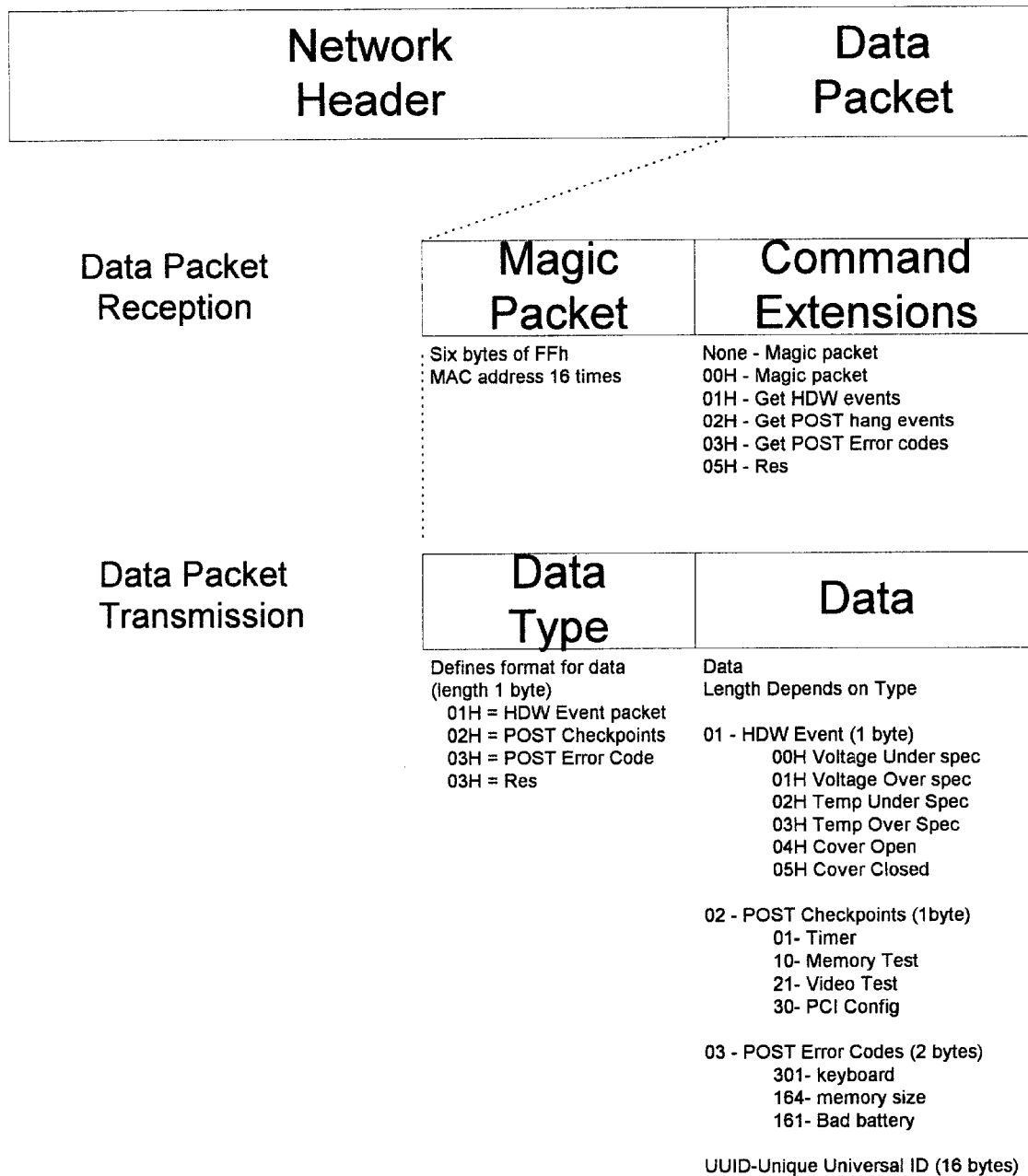
FIG. 6 is a diagrammatic representation of a packet of FIG. 5 with data areas for reception and transmission respectively according to the invention.

A standard packet including a network header and data packet as might be sent over an ethernet network is indicated in FIG. 5. The network header includes a MAC header, an IP header and UDP header as is known to provide addresses, identifiers and other information for as assuring correct transfer. The data packet includes the information content to be transferred. Details of the data packet content according to the invention are indicated in FIG. 6. For reception, the straight Magic Packet content is the known wake up command. With the special extensions as indicated the network manager may trigger or turn off activity of the logic 400. For the transmission packets created by logic 400 and asserted at the MII bus (see FIG. 4), the data type and data patterns indicated for transmission in FIG. 6 are preferrably followed according to the invention. First data type is used to set up a category of data and then a data portion provides specific information. The data indicated would, for example, be information supplied by the sensors 402 (FIG. 4).

Figure 7:
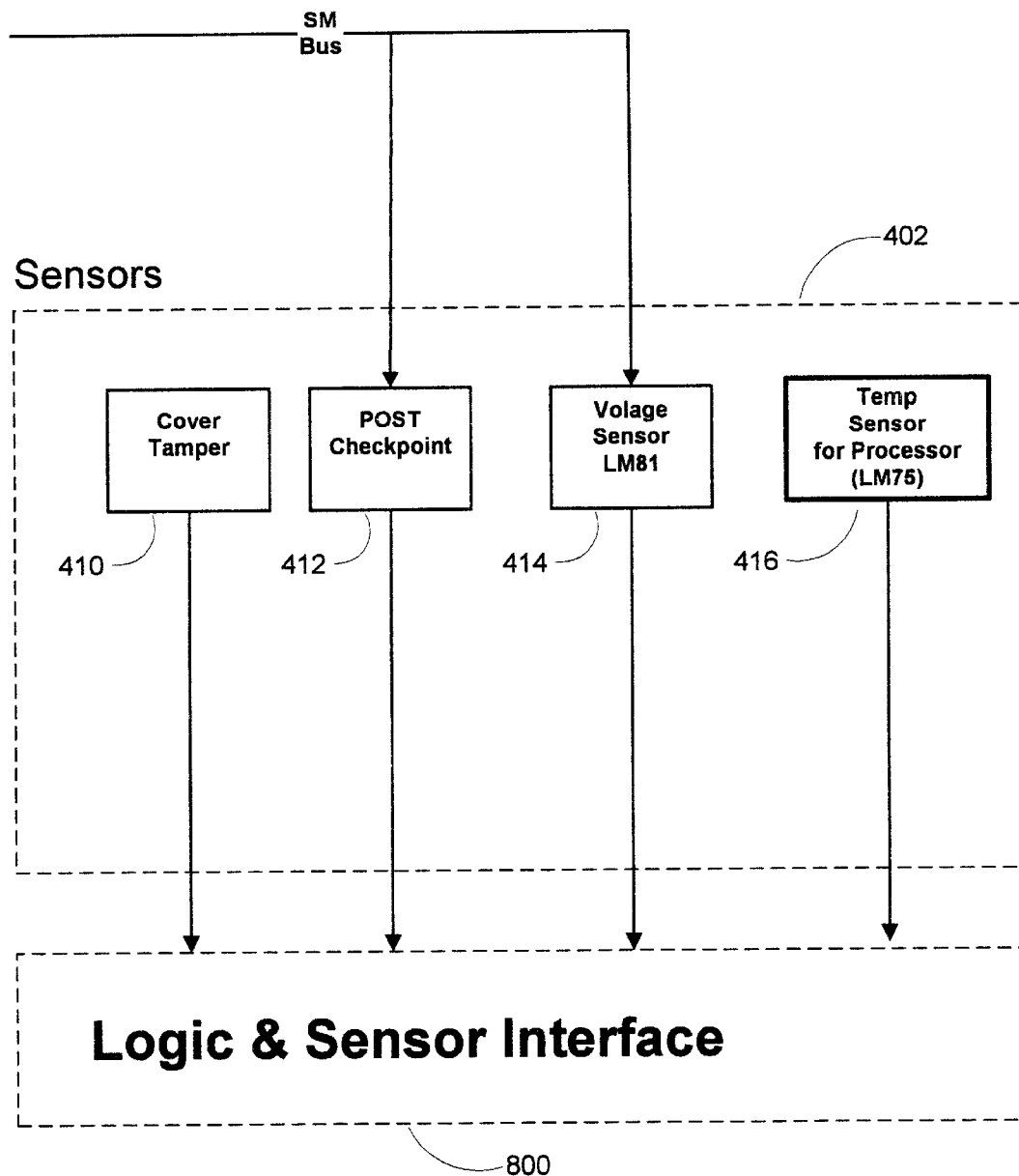
FIG. 7 is a simplified block diagram showing sensors for collecting selected system information.

Referring to FIG. 7, the sensors 402 for providing data to the logic 400 may include a cover tamper sensor 410, a POST checkpoint sensor 412, a voltage sensor (e.g. part LM81 from National Semiconductor Corp.) 414, and a temperature sensor (e.g. part LM75 from National Semiconductor Corp.) 416. If necessary selected sensors may be initialized by the SM bus.

Figure 8:
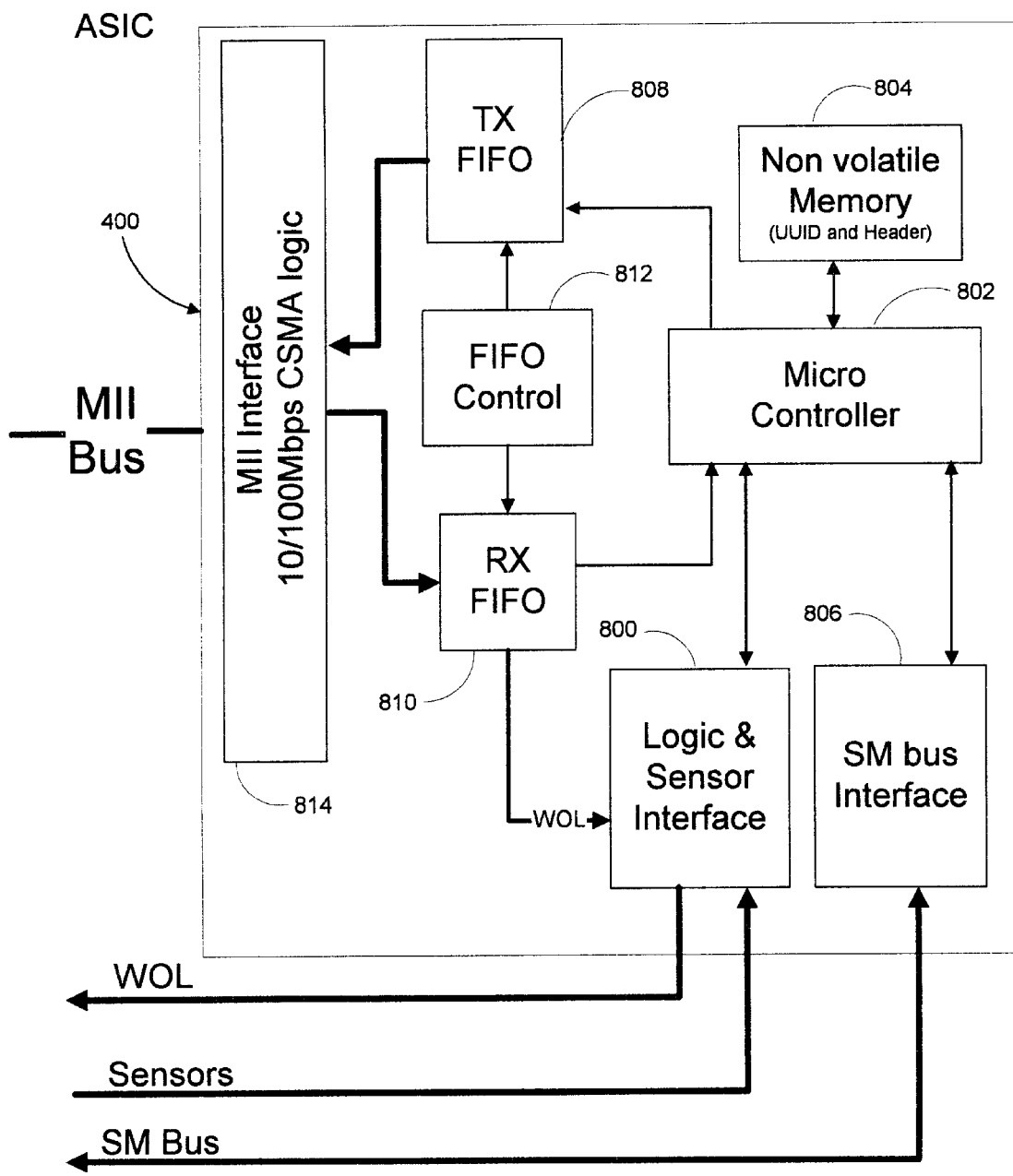
FIG. 8 is a block diagram indicating chip modules connected to perform the role of the auxiliary logic according to the invention.

Component modules of the logic 400 are indicated in FIG. 8. A microcontroller 802 coordinates the processing of information according to the invention and cooperates with a non volatile memory 804 which retains the universal identifier (UUID) for the client system and the packet header. A System Management (SM) bus interface 806 provides reset information and the logic and sensor interface 800 retains the latest data from the sensors 402

Figure 9:
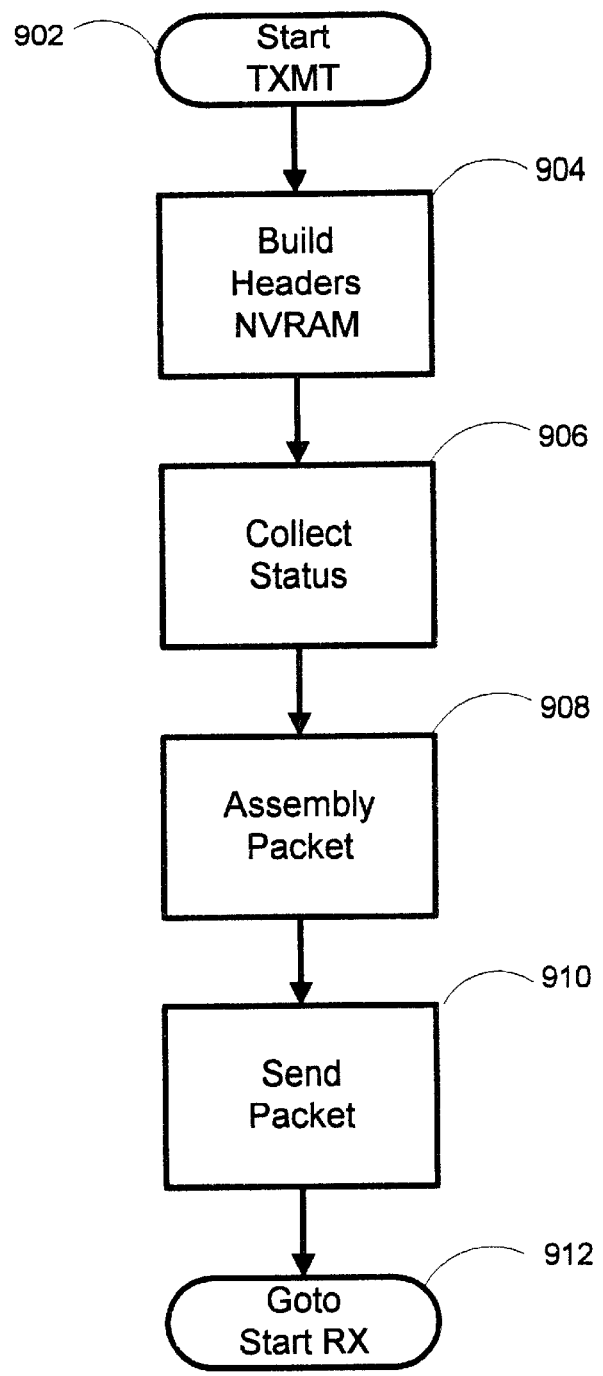
FIG. 9 is a flow chart indicating logic for generating the transmitted data packets of FIG. 6 which may be implemented as hard logic or using a programmed general purpose processor.
Figure 10:
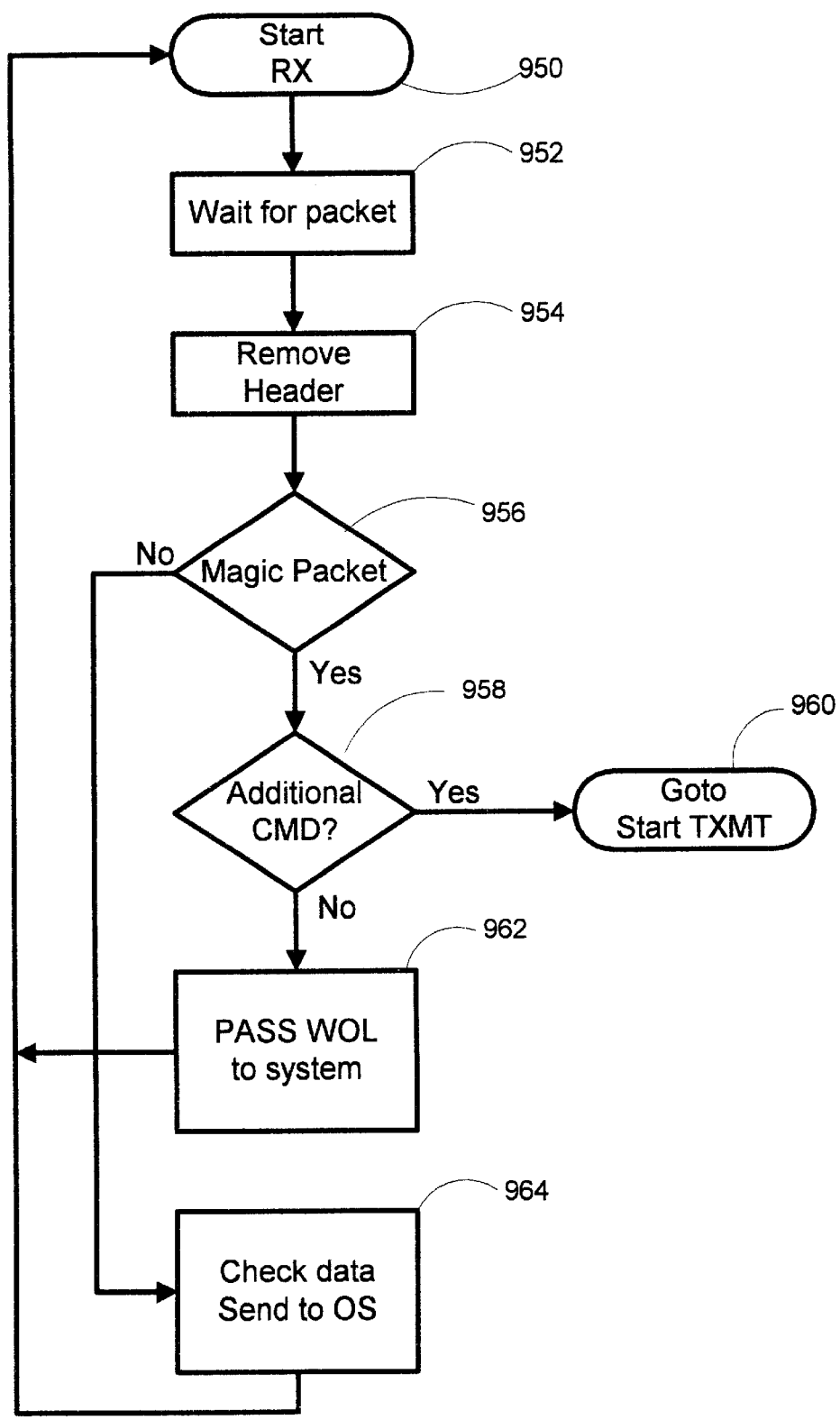
FIG. 10 is flow chart diagram describing logic for interpreting data packets received from the network in the form described at FIG. 6.

Referring to FIG. 9, the logic steps to prepare and send packets for transmission over the network according to the invention, begin at the transfer block SXT(902). At step 904 the logic 400 builds headers as described at FIG. 5 using data stored in the nonvolatile memory 804. The sensor data is collected from the logic and sensor interface 800 at step 906 and the packet is assembled at step 908 and transmitted at step 912. The logic then transfers (912) to the receive process (950) of FIG. 10.

In the receive proces the microcontroller 802 waits for a packet (952) and on receiving one removes the header (954) and determines if it conforms to the Magic Packet specification. If not the data is sent to the Operating system (964) and the process returns to 950. If so, the packet is checked for additional data and if none a wake up signal is sent. If so, the logic transfers to the transmit process 960.

The invention has been described with reference to preferred implementations thereof but it will be appreciated that variations and modifications within the scope of the claimed invention will be suggested to those skilled in the art. For example, the invention may be implemented on networks other than Ethernet networks such as token ring networks.

What is claimed is:

1. A client system, for a personal computer network, which includes a network adapter with a transfer portion, adapted to be connected to the network that conditions signal packets provided in a predefined digital format received from a client side portion thereof to a form to be transmitted over such a network, which client system includes:

auxiliary logic connected to transfer portion at the client side thereof, which creates packets according to the predefined digital format and applies them to said transfer portion for transmission over the network;

a sensor interface included within said auxiliary logic for storing and maintaining a current state of each of a plurality of condition sensors; and said plurality of condition sensors connected to said sensor interface which are arranged in said client and supply to said auxiliary logic condition information regarding said client, whereby condition information stored in said sensor interface may be retrieved form said sensor interface and sent to such network by said auxiliary logic in conjunction with said adapter without intervention by the client system.

2. A client system according to claim 1 wherein said personal computer network conforms to the Ethernet specification and the signals on said network are digitally encoded analog signals according to Ethernet protocol.

3. A client system according to claim 1 wherein the auxiliary logic applies the signals periodically to said transfer portion to indicate selected state information regarding the client.

4. A client system according to claim 1 wherein the auxiliary logic and network adapter are powered separately of the rest of said client system whereby the information packets may be sent independently of the power state of the client system.

* * * * *